April 28, 1970  R. S. SIEGLER ET AL  3,508,397
RESONANT COMBUSTOR WITH REVERSE BEND EXHAUST PASSAGEWAY
Filed March 14, 1968  2 Sheets-Sheet 1

INVENTORS.
ROBERT S. SIEGLER
ROBERT L. BINSLEY
BY John E. Kelly
ATTORNEY

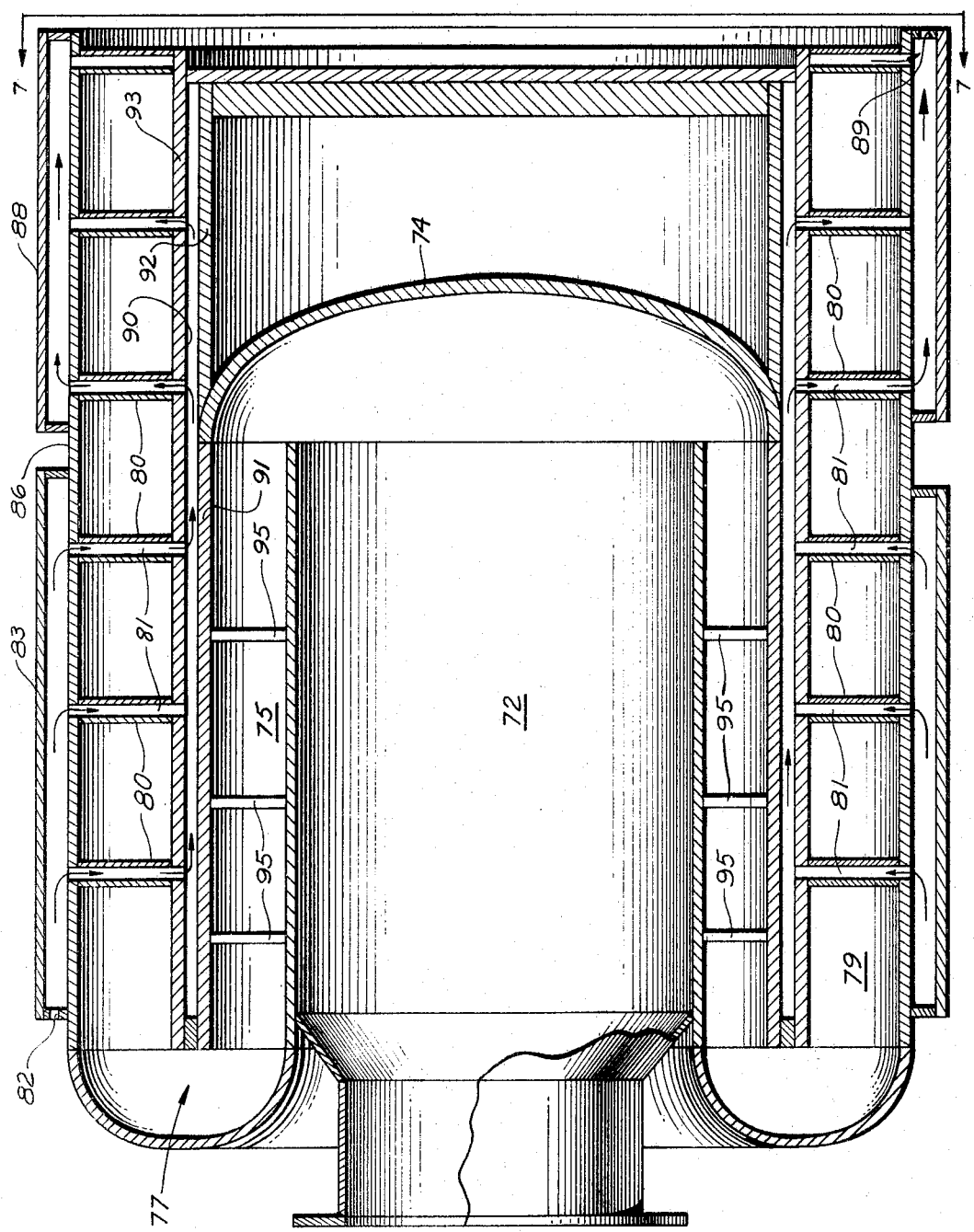

United States Patent Office 3,508,397
Patented Apr. 28, 1970

3,508,397
RESONANT COMBUSTOR WITH REVERSE BEND EXHAUST PASSAGEWAYS
Robert S. Siegler, Hidden Hills, and Robert L. Binsley, Sepulveda, Calif., assignors to North American Rockwell Corporation
Filed Mar. 14, 1968, Ser. No. 713,180
Int. Cl. F02c 5/10
U.S. Cl. 60—39.77            13 Claims

ABSTRACT OF THE DISCLOSURE

A resonant or pulse jet-type combustor having an annular exhaust passageway of reverse bend configuration. The exhaust passageway has radial inner and outer passageway portions in which laterally spaced, spirally oriented vanes are disposed to form spirally oriented passageways. The spiral passageways may be hollow for conducting coolant fluid. By this arrangement the required acoustical length is of tortuous configuration so that the overall end-to-end combustor length is substantially decreased.

BACKGROUND OF THE INVENTION

The present invention relates to pulse jet-type or resonant combustors whose combustion gases are discharged through a reverse bend exhaust passageway to a turbine designed to start the operation of a self-sustaining engine.

The broad concept of positioning the exhaust exit of a pulse jet-type combustor in operative driving relationship with a turbine is known in the art. Such a power generating arrangement used as a supercharger for a vehicle internal combustion engine is disclosed in U.S. Patent 2,963,863 to Middlebrooks. It is also known in the art to use the hot gases generated in a combustor, not of the pulse jet-type, for operating a turbine design to "start," i.e., initiate the motion of, an engine system (e.g., U.S. Patent 3,004,387 to Woodward). It is known to drive turbines with combustion gases from an internal combustion engine whose combustion chamber and single exhaust passageway are shaped into a reverse bend annular path (e.g., U.S. Patent 1,278,499 to Esnault-Pelterie). Another related approach for driving a starter turbine with combustion gases guided over a tortuous, zigzag path is disclosed in U.S. Patent 2,908,135 to King et al. Conventional combustors of this type, none of which are resonant or pulse jet-type combustors, have their combustion chambers and exhaust passageways specially shaped so as to conserve space, weight, etc., or to provide sufficient space to assure complete decomposition of the combustion ingredients. Combustion chambers and exhaust passageways of these conventional combustors are not shaped to constitute a precise acoustical length which is crucial to the performance of resonant combustors as shall be more fully described.

As disclosed in co-pending U.S. applications, Ser. No. 576,726, filed Sept. 1, 1966, now Patent No. 3,411,292 and Ser. No. 583,624, filed Oct. 3, 1966, now abandoned, (which applications are assigned to the assignee of this invention), the combustion product of a resonant or pulse jet-type combustor can be discharged through a plurality of exhaust passageways onto blades of a starter turbine designed to initiate the operation of a self-sustaining engine. This invention is concerned with minimizing the end-to-end length of the combustor by incorporating therein a reverse bend exhaust passageway, portions of which may include spirally oriented passageways.

SUMMARY OF THE INVENTION

Briefly described the present invention is a resonant or pulse jet-type combustor whose exhaust passageway is shaped so that the overall end-to-end combustor length is greatly minimized as compared with conventional combustors capable of generating equivalent power. Extending between the combustion chamber and exhaust exit, which is positioned adjacent the blades of a starter turbine for example, is an exhaust passageway of reverse bend configuration. The reverse bend exhaust passageway has radial inner and outer passageway portions. The reverse bend passageway is formed by a double walled casing having a tubular outer section and a tubular inner section joined together by a torus or curved wall section. Extending into the space between the tubular inner and outer sections is a tubular plate attached to the edges of a dome. The dome forms a portion of the combustion chamber and is contoured to deflect combustion product into the radial inner passageway portion. Coaction between the casing sections and the tubular plate define the shape of the reverse bend passageway.

Positioned in the radial inner or outer passageway or both passageways are laterally spaced, spirally oriented vanes that define spiral exhaust passageways. The spiral exhaust passageways permit the end-to-end combustor length to be further decreased. When vanes are disposed in both radial inner and outer passageways, the vanes in each may be joined together to constitute continuous uninterrupted spiral exhaust passageways. Some or all of the vanes may be hollow to conduct coolant fluid so as to cool portions of the combustor. During operation of the combustor, coolant is continuously circulated to cool the vanes and other combustor components.

BRIEF DESCRIPTION OF THE DRAWINGS

The above-described advantages and unique aspects of the present invention will be fully understood upon studying the following detailed description in conjunction with the drawings in which.

FIG. 2 is a longitudinal sectional view of another embodiment of the combustor, showing spirally oriented exhaust passageways formed over the major portion of the reverse bend passageway and a coolant system for circulating coolant through portions of the combustor.

DESCRIPTION OF THE PREFERRED EMBODIMENTS

Figure 1:
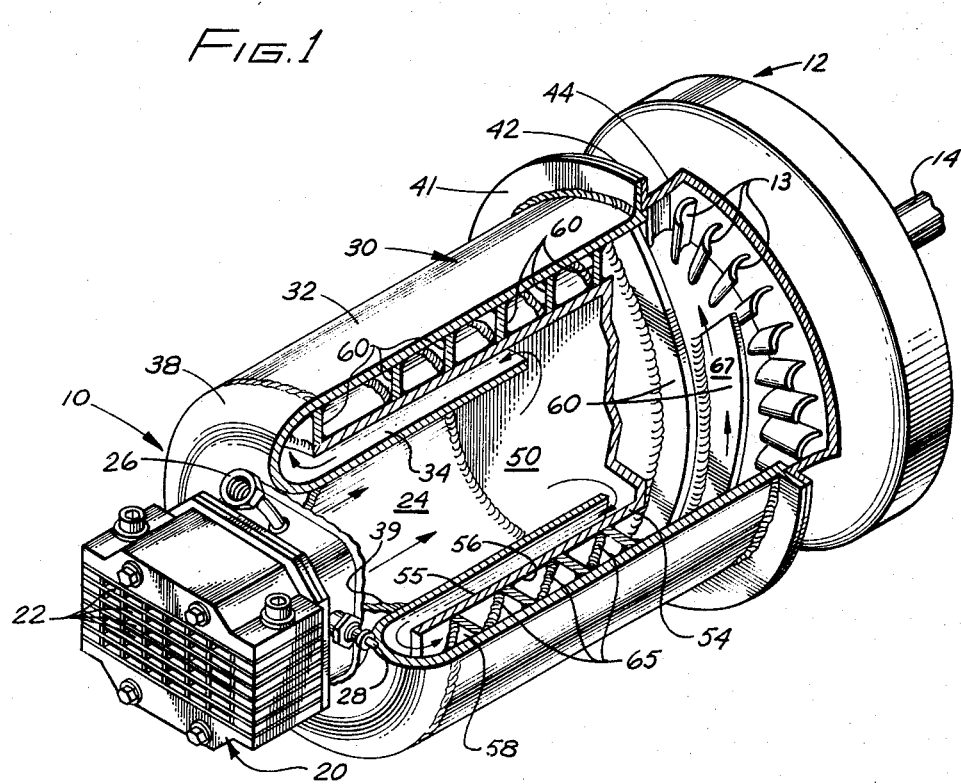
FIG. 1 is a perspective, partially sectional view of the combustor, showing the reverse bend exhaust passageway formed over a segment of its length with spirally aligned exhaust passagewaays.

Referring now to the drawings for a full explanation of the advantages and unique aspects of the present invention, FIG. 1 shows a pulse jet-type or resonant combustor 10 coupled to a turbine assembly 12 arranged to operate a power shaft 14. The rotary movement of shaft 14 may, for example, be used to start the operation of a self-sustaining engine. Rigidly fixed to the forward end of combustor 10 is a valve assembly 20 incorporating a plurality of air inlet flapper valves 22 such as those disclosed in previously mentioned co-pending application Ser. No. 576,726. Fresh charges of external air admitted through flapper valves 22 are mixed within a combustion chamber 24 with fuel introduced through a fuel injector 26. A conventional igniter plug 28 causes initial explosion of the fuel-air mixture to generate combustion product in the usual manner.

A double-walled casing is integrally formed with a tubular exterior section 32 and a tubular interior section 34 that merge together forming a torus or curved section 38. Valve assembly 20 is secured to a recessed zone of torus 38 by a rearwardly diverging plate 39. Alternatively, casing sections 32, 34 and 38 could be independently fabricated and then secured together by welding, etc. The rearward end of exterior section 32 terminates in a radial flange 41 that is matched with and secured to a forwardly disposed radial flange 42 of a turbine assembly housing 44. The rearward end of interior casing section 34 terminates axially forwardly of a dome 50. Dome 50 has a concavely contoured side that defines a portion of combustion chamber 24. Extending forwardly from the peripheral edge of dome 50 is a tubular plate 54 aligned approximately half way between annular casing sections 32 and 34. As employed to describe the present invention, the terms forward and rearward are intended to refer respectively to the zones of combustor 10 where combustion product is generated and ultimately discharged.

It can be seen that casing 30 and annular plate 54 coact to structurally define a U-shaped or reverse bend annular passageway 58 characterized by radial inner and outer passageway portions. Combustion product generated in combustion chamber 24 is deflected by dome 50 into the radial inner passageway portion of reverse bend annular passageway 58. Combustion product is (1) driven forwardly between casing section 34 and tubular plate 54, (2) is then redirected approximately through an arc of 180° by way of curved section 38 and, (3) is passed through the radial outer passageway portion of passageway 58 defined by exterior casing 32 and plate 54, and (4) eventually is discharged on the turbine blades 13. Helically disposed within the radial outer passageway portion of passageway 58 are a plurality of laterally spaced spirally oriented vanes 60. The resulting multiple channels formed by plate 54, casing section 32 and adjacent vanes 60 constitute distinct spirally oriented exhaust passageways 65. Exhaust passageways 65 divide the combustion product into multiple segments that are directed to arcuate exhaust exits 67 (only one of which is shown). From exhaust exit 67 the combustion product is ejected onto blades 13 of turbine 12.

Before describing further structural details of resonant combustor 10 it would prove beneficial to describe a basic resonant combustion cycle which greatly differs from combustion cycles of other types of combustors. Unlike other types of combustors, resonant combustors must be sized and shaped to possess a particular acoustical length, the accuracy of which vitally affects the operation and efficiency of the combustor. In the case of conventional pulse jet-type combustors, acoustical length is equivalent to the overall end-to-end length. This necessitates excessive length, weight, cost, space consumption, etc. which disadvantages among others are overcome by the present invention. The acoustical length is characterized by the distance that representative mass of combustion product travels from its point of explosion to its point of ejection through an exhaust passageway exit. In combustor 10 the acoustical length is constituted by the axial length of combustion chamber 24 plus the longitudinal length of reverse bend annular passageway 58. When reverse bend annular passageway 58 incorporates spirally aligned exhaust passageways as shown in FIG. 1, then the acoustical length would be characterized by the length of a spirally aligned exhaust passageway, plus the longitudinal length of any portion of the annular passageway not occupied by spiral exhaust passageways, plus the axial length of combustion chamber 24.

As used to explain the present invention, the term "longitudinal" means any curved or straight path for describing the geometric configuration of combustor components, e.g., the reverse bend annular exhaust passageway and the spiral exhaust passageways. In the former case the longitudinal length would be of U or reverse bend shape and in the latter case the longitudinal length would be of spiral shape. By this arrangement, it can be seen that the acoustical length is larger than the overall combustor length and therefore the combustor is shorter, lighter and consumes less volume than conventional resonant combustors capable of generating equivalent power. When the path over which the combustion product must travel is less than the minimum acoustical length, then, after the initial explosion, the combustor would fail to resonate and its operation would terminate. When the path over which the combustion product must travel is greater than the maximum acoustical length then combustion efficiency and thrust correspondingly diminish. The proper acoustical length can be approximately calculated from formulas but is ultimately ascertained empirically. To begin the combustion cycle, air and fuel are mixed and ignited causing an initial explosion that transmits a pressure wave (i.e., a wave that compresses fluid such that the pressure at a given point increases when the wave is passed) from combustion chamber 24 through annular passageway 58 and spiral exhaust passageways 65 and eventually beyond exhaust exit 67. A second wave in the form of an expansion wave (i.e., a wave that expands or rarefies fluid such that the pressure at a given point is diminished after the wave is passed) is then reflected from the exhaust exit 67 and moves in a reverse direction into combustion chamber 24. The presence of the expansion wave within combustion chamber 24 causes the pressure therein to diminish below ambient pressure. The resulting differential pressure causes fresh charges of air to be drawn through flapper valves 22. A third wave in the form of a second expansion wave then travels through the acoustical length and beyond exhaust exits 67. The fourth and final wave in the form of a pressure wave carries back-flow air through the passageways and into chamber 24 where the back-flow air rams the new charge of ambient air so as to precompress the fuel and air mixture preparing it for another explosion. The next explosion initiates the second resonant combustion cycle. Each resonant combustion cycle is characterized by four trips of pressure and expansion waves over the acoustical length of combustor 10. If the length over which the combustion wave must travel deviates from the particular acoustical length determined by the gas conditions in the combustor (temperature, density, pressure, and gas composition), then the cycle does not function properly and a power degradation occurs. Combustor 10 becomes self-sufficient and the explosions are repeated automatically until terminated by some external force.

In another embodiment shown in FIGURE 2, a resonant combustor 70 has a combustion chamber 72 and a dome 74 for deflecting combustion product into radial inner passageway portion 75 of reverse bend annular passageway 77. Positioned in radial outer passageway portion 79 are a plurality of laterally spaced spirally oriented double walled vanes 80 whose hollow spaces serve as coolant passageways 81. Coolant fluid is admitted through an inlet port 82 to an annular inlet coolant manifold 83 that surrounds a forward portion of tubular exterior section 86. Disposed rearwardly of manifold 83 is an annular outlet coolant manifold 88 formed with a coolant discharge port 89. Portions of vanes 80 and reverse bend annular passageway 77 are cooled by transmitting coolant fluid from manifold 83 and forwardly disposed vanes 80 through an intermediate coolant manifold 90 to rearwardly disposed vanes 80 and manifold 88. Intermediate manifold 90 is formed by tubular plate 91, a rearward extension 92 of tubular plate 91 and another tubular plate 93 which surrounds and is substantially coextensive with plates 90 and 92.

Figure 3:
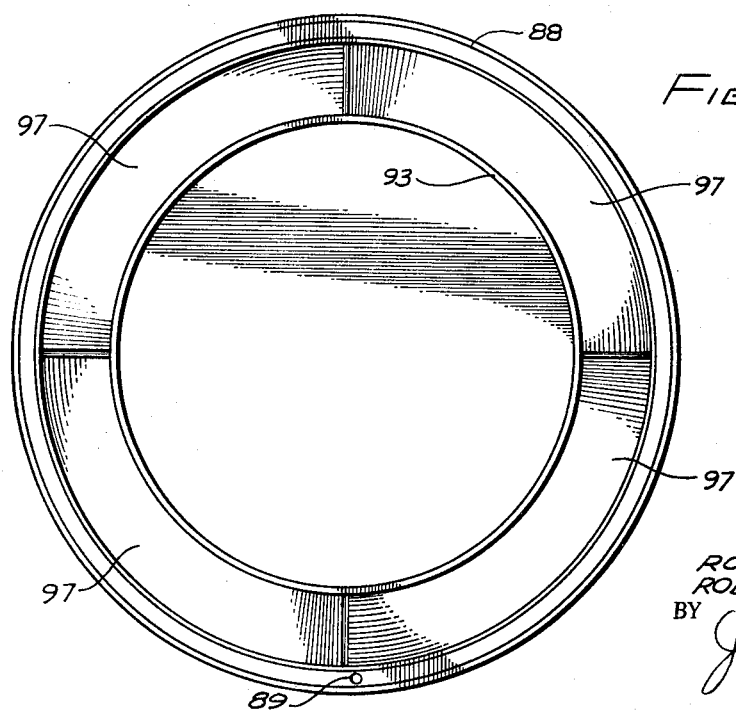
FIG. 3 is an end view taken along line 3—3 of FIG. 2, showing how the spiral passageways terminate in arcuate exits.

In order to further shorten the overall end-to-end length of combustor 70, additional laterally spaced spirally oriented vanes 95 can be disposed within radial inner passageway 75. The number of vanes within passageway 75 and 79 may be of equal number and joined together so as to constitute continuous, uninterrupted exhaust passageways. Vanes 95, if desired, can be modified to incorporate coolant passageways so that additional portions of combustor 70 could also be cooled. It is to be understood that this cooling system is merely illustrative and that any other suitable cooling system is within the contemplation of this invention. FIG. 3 shows how the spiral exhaust passageways terminate in arcuate exhaust exits 97.

Although numerous combustors of various sizes and dimensions can be assembled, one that has been built and successfully operated had a combustion diameter of 4 inches, a maximum case diameter of 7⅜ inches, a radial inner passageway width of approximately ⅔ inch, a radial outer passageway width of approximately 1 inch, an overall end-to-end length of 11½ inches and an acoustical length of 54 inches.

What is claimed is:

1. In a resonant combustor having a combustion chamber, an air inlet, a fuel inlet and means for igniting mixtures of air and fuel to generate combustion product, the improvement comprising:
    a casing containing a part of the combustion chamber, and,
    means fixedly arranged internally of the casing and extending longitudinally therewith such that said means and casing form a longitudinally extending reverse bend annular exhaust passageway that is in communication at one end with the combustion chamber and terminates in an open exhaust exit at its opposite end, the combined axial length of the combustion chamber and longitudinal length of the reverse bend passageway being equivalent to the acoustical length for achieving resonant combustion.

2. The combustor according to claim 1 further comprising means extending longitudinally of and positioned inside the reverse bend annular exhaust passageway defining at least one spirally oriented continuous exhaust passageway encircling said fixedly arranged means,
    wherein the combined axial length of the combustion chamber plus the longitudinal length of the spiral exhaust passageway, plus the longitudinal length of that portion of the reverse bend passageway not including a spiral exhaust passageway is equivalent to the acoustical length for achieving resonant combustion.

3. The combustor according to claim 2 comprising a plurality of laterally spaced spirally oriented vanes positioned inside the reverse bend annular exhaust passageway to form a plurality of parallel, discrete spiral exhaust passageways extending longitudinally therewith.

4. In resonant combustor having a combustion chamber, an air inlet, a fuel inlet and means for igniting mixtures of air and fuel to generate combustion product, the improvement comprising:
    a double walled casing having a tubular outer section and a fixed tubular inner section forming a portion of the combustion chamber, the inner and outer sections being joined together at one set of their ends by a curved wall section, and,
    a fixed tubular member inserted between the tubular inner and outer sections forming a longitudinally extending reverse bend annular exhaust passageway, the exhaust passageway being in communication with the combustion chamber at one end and terminating in an exhaust exit at its opposite end,
    wherein the combined axial length of the combustion chamber and longitudinal length of the reverse bend passageway is equivalent to the acoustical length for achieving resonant combustion.

5. The combustor according to claim 4 wherein the reverse bend annular passageway is arranged such that the curved wall section is located at one end of the combustor and the exhaust passageway exit is located at the opposite end of the combustor, and
    a dome is positioned with its outer edges connected to the tubular member, the member being contoured to deflect combustion product into a radial inner passageway portion of said passageway.

6. In resonant combustor having a combustion chamber, an air inlet, a fuel inlet and means for igniting mixtures of air and fuel to generate combustion product, the improvement comprising:
    a double walled casing having a tubular outer section and a tubular inner section forming a portion of the combustion chamber, the inner and outer sections being joined together at one set of their ends by a curved wall section, and
    a tubular member inserted between the tubular inner and outer sections forming a longitudinally extending reverse bend annular exhaust passageway, the exhaust passageway being in communication with the combustion chamber at one end and terminating in an exhaust exit at its opposite end,
    wherein the reverse bend passageway is aligned such that it has radial inner and outer passageway portions, and
    means is positioned within the radial outer passageway portion defining at least one spirally oriented exhaust passageway, such that the combined axial length of the combustion chamber plus the longitudinal length of the spiral exhaust passageway plus the longitudinal length of that portion of the reverse bend passageway not including a spiral exhaust passageway is equivalent to the acoustical length for achieving resonant combustion.

7. The combustor according to claim 6 wherein the spiral exhaust passageway is defined by laterally spaced spirally oriented vanes.

8. The combustor according to claim 6 wherein laterally spaced spirally oriented vanes are positioned within the radial inner passageway portion to form at least one spiral exhaust passageway.

9. The combustor according to claim 6 wherein a plurality of spiral exhaust passageways are disposed within both radial inner and outer passageway portions.

10. The combustor according to claim 6 comprising laterally spaced spirally oriented vanes positioned inside the radial inner and outer passageways, wherein, the vanes positioned inside the radial inner passageway join the vanes positioned inside the radial outer passageway to constitute at least one continuous spiral exhaust passageway.

11. The combustor according to claim 6 further comprising,
    a plurality of spirally oriented exhaust passageways that terminate in arcuate exits positioned adjacent the blades of a turbine.

12. The combustor according to claim 6 further comprising,
    a cooling system for cooling portions of the reverse bend exhaust passageway and spiral exhaust passageway.

13. The combustor according to claim 12 wherein the cooling system comprises:
    an inlet coolant manifold connected to a forward portion of the tubular outer section, an outlet coolant manifold connected to a rearward portion of the tubular outer section,
    an intermediate coolant manifold positioned between the tubular outer section and tubular inner section, and
    means in the vanes forming hollow spaces for conducting coolant fluid wherein a portion of the vanes place the inlet and intermediate manifold in communication and another portion of the vanes place the intermediate and outlet manifolds in communication.

References Cited

UNITED STATES PATENTS

| | | | |
|---|---|---|---|
| 2,102,559 | 12/1937 | Kadenacy | 60—32 |
| 2,791,271 | 5/1957 | Kauffeld | 60—39.77 XR |

FOREIGN PATENTS

| | | |
|---|---|---|
| 176,838 | 3/1922 | Great Britain. |
| 928,866 | 6/1947 | France. |

CARLTON R. CROYLE, Primary Examiner

D. HART, Assistant Examiner